United States Patent

Benner et al.

[11] Patent Number: 6,164,737
[45] Date of Patent: Dec. 26, 2000

[54] SWITCHING CABINET WITH A RACK

[75] Inventors: Rolf Benner; Martina Köhler, both of Herborn; Udo Münch, Sinn; Wolfgang Reuter, Burbach, all of Germany

[73] Assignee: Rittal-Werk Rudolf Loh GmbH & Co. KG, Herborn, Germany

[21] Appl. No.: 09/308,155

[22] PCT Filed: Nov. 6, 1997

[86] PCT No.: PCT/EP97/06154

§ 371 Date: May 14, 1999

§ 102(e) Date: May 14, 1999

[87] PCT Pub. No.: WO98/23010

PCT Pub. Date: May 28, 1998

[30] Foreign Application Priority Data

Nov. 19, 1996 [DE] Germany ............ 196 47 790

[51] Int. Cl.[7] ................... A47G 29/00
[52] U.S. Cl. .............. 312/232.1; 312/265.5
[58] Field of Search ............. 312/265.1, 265.2, 312/265.3, 265.4, 223.1, 263, 257.1, 351; 211/189, 190, 191

[56] References Cited

U.S. PATENT DOCUMENTS

| 3,265,419 | 8/1966 | Durnbaugh et al. | 312/265.5 |
| 4,643,319 | 2/1987 | Debus et al. | 312/140 |
| 5,806,945 | 9/1998 | Anderson et al. | 312/265.5 |

FOREIGN PATENT DOCUMENTS

| 19 04 558 | 11/1969 | Germany. |
| G 84 29 688 | 1/1985 | Germany. |
| DE 37 31 547 | 3/1989 | Germany. |
| G 93 04 630 | 7/1993 | Germany. |
| DE 195 37 015 | 2/1996 | Germany. |
| WO 90/15464 | 12/1990 | WIPO. |

*Primary Examiner*—Peter M. Cuomo
*Assistant Examiner*—Jerry Anderson
*Attorney, Agent, or Firm*—Pauley Petersen Kinne & Fejer

[57] ABSTRACT

A switching cabinet with a rack having a base made of length and depth struts with connected vertical frame pieces. The vertical frame pieces are inserted into a cavity formed by the ends of the length and depth struts and are welded with the base to form a corner connector. It is possible to create a switching cabinet with a simple corner connector mounted on the rack. It is also possible to achieve precise alignment of the vertical frame pieces by providing them with centering pieces which are aligned with stops of the length and depth struts.

9 Claims, 2 Drawing Sheets

SWITCHING CABINET WITH A RACK

BACKGROUND OF THE INVENTION

1. Field of the Invention

This invention relates to a switching cabinet with a rack, having a base made of length and depth struts with connected vertical frame pieces, where the vertical frame pieces are inserted into a cavity formed by the ends of the length and depth struts and are welded with the base to form a corner connector.

2. Description of Prior Art

A switching cabinet of this kind is known, for example, from German Patent Reference DE 19 04 558. In switching cabinets of this kind a separate corner connector is omitted, so that the single vertical frame leg and length or depth struts are welded directly to each other. The length and the depth struts are designed as angled profiles. The depth strut is butt welded by its planar front side to a leg of the length strut.

The vertical frame leg designed as angle profile and likewise having two legs can then be tied to the formed base. In this case, one of the legs has a front release. Thus, of the second leg there remains a front gluing edge, to which the length strut of the base will rest on its front side.

With this type of corner connection it is difficult to align the vertical frame leg to the base so that it is easy and accurate to weld, and so that it will be precisely positioned. For this reason PCT International Publication WO 90/15464 teaches an additional element secured to the depth strut, so that the length strut of the vertical frame leg can be positioned. Now this corner connection requires an additional part, which requires a correspondingly greater expense.

SUMMARY OF THE INVENTION

It is one object of this invention to create a switching cabinet of the type described above, in which a corner connection to the rack is simply designed and provides a precise alignment of the vertical frame leg.

According to this invention the vertical frame pieces have centering pieces aligned with stops of the length and depth struts. The vertical frame leg can be moved into position along the stops. The centering pieces together with the stops form a forced guide for the vertical frame leg which keeps the position of the joined parts upright during the welding process. By this simple measure, additional corner connector elements to align the vertical frame leg can be omitted so that the rack is of simple design.

According to one embodiment of this invention, the centering surfaces of the vertical frame leg are aligned perpendicular to the associated side surface of the rack, the stops are of web-like design and are positioned at an angle of 90° to each other and form an open cavity.

The vertical frame leg can be inserted into the cavity from the outside into the base. The web-like stops will then rest against the centering pieces.

If a web is located on the length and depth struts in a vertical direction at a distance from the stops, so that the vertical frame leg is braced against its front abutting end, and if the vertical frame leg is welded at an abutting end and at centering pieces with the length and depth struts, then a stable anchoring of the vertical frame leg is possible.

Because the abutting end is located at a distance from the stops, high torque can be applied to the vertical frame leg.

A switching cabinet according to this invention has the vertical frame leg profiled at an outward pointing side in a corner area, and the webs have a recess adapted to this profiling.

Very different kinds of attachments can be braced in the profile of the frame leg. For example, hinge elements or closing units for a door can be used, or angle-bends of connected side walls can be used. Interfering material protrusions, which would be a possible hazard, are avoided by the adapted recesses in the length or depth struts. Furthermore, the vertical frame leg can be prepositioned to the adapted recess so that it has a precise alignment.

According to one preferred embodiment of this invention, side parts of the vertical frame leg are connected to the centering pieces, and the side parts in the contact web extend into the contact web to form a sealed and/or contact frame for a side wall, a switching cabinet door or the like.

Because the centering pieces are aligned to the stops, the side piece is adapted to the contact web. An attachment element can be sealed off with the sealed and/or contact frame.

In a switching cabinet of simple design the ends of the vertical frame piece are turned away from the socket, and a cover frame is provided with a configuration that corresponds to the socket.

BRIEF DESCRIPTION OF THE DRAWINGS

This invention will be explained in greater detail below, based on one preferred embodiment shown in the figures wherein.

DESCRIPTION OF PREFERRED EMBODIMENTS

Figure 1:
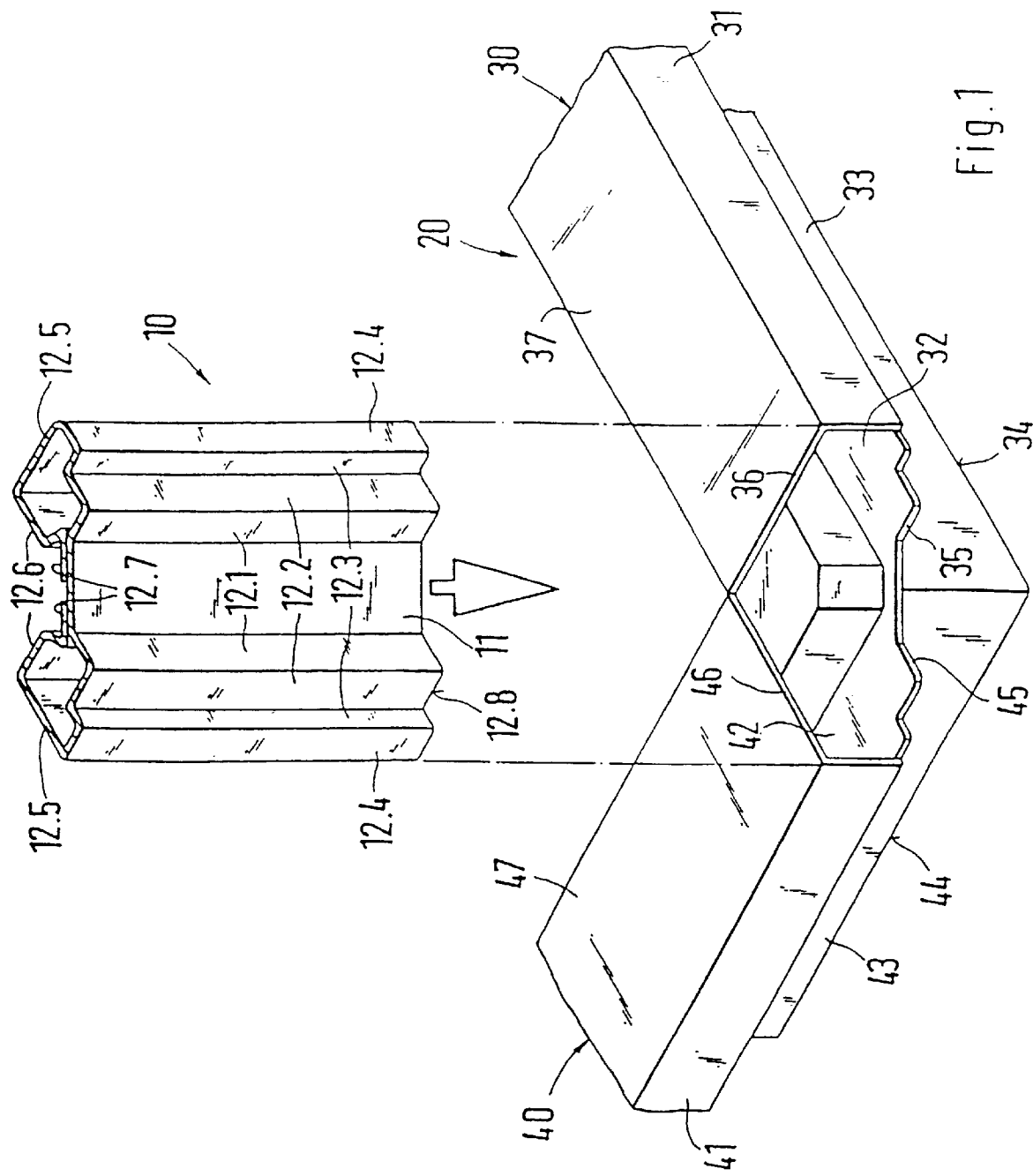
FIG. 1 is a partial perspective, exploded view of a part of a corner region of a rack.

FIG. 1 shows a base 20 which comprises length and depth struts 30, 40. The length and depth struts 30, 40 have the same cross-sectional geometry. The entire base 20 comprises two length and two depth struts 30, 40, which are each aligned parallel to each other. To produce the base 20, a single stamped-flexible part is used, so that the individual length and depth struts 30, 40 are joined together as a single piece. The length and depth struts 30, 40 have a horizontal cover part 37, 47, to which a contact web 31, 41 angled downward by 90° is attached.

The contact web 31, 41 is used to contact a side wall or a cabinet door, for example. A sealing element can be installed between the side wall element or the cabinet door and the contact web 31, 41 to provide the seal. From the contact web 31, 41 there is a horizontal web 32, 42 bent back at a right angle. The horizontal web 32, 42 extends into the downward-directed wall 33, 43. An edge of the wall element or of the cabinet door can be held in the free space formed by the horizontal web 32, 42 and the wall 33, 43.

The wall 33, 43 is sealed off with a bottom unit 34, 44. The base 20 can be set up on the bottom. The length or depth struts 30, 40 have at the front ends recesses 35, 45 at their horizontal webs 32, 42. The recesses 35, 45 are adapted to the outer geometry of a vertical frame leg 10. In the perpendicular direction, at a distance from the horizontal web 32, 42, there are end stops 36, 46 of the covering pieces 37, 47 for centering pieces 12.5 of the vertical frame leg 10.

The vertical frame leg 10 has a connection web 11, from which hollow chambers extend on both sides. To form the hollow chambers, the sheet metal cut is angled off several times for the vertical frame leg 10. In particular, an angle 12.1 follows the connection web 11 which passes via a transition piece 12.2 into an angled piece 12.3. The angled piece 12.3 is positioned perpendicular to the associated side wall of the rack. Adjoining the angle bends 12.3 are right-angled side pieces 12.4. The side pieces 12.4 are used as support surfaces for the rack door or the side wall. To form the centering pieces 12.5, the side parts 12.4 are bent at a right angle in a direction of the interior of the rack. The centering pieces 12.5 extend in a right angle into reinforcing sections 12.6. The reinforcing sections 12.6 are thus parallel to the associated side walls of the rack. The reinforcing sections 12.6 rest by angled end pieces against the connecting web 11, where they are secured.

The vertical frame leg 10 is inserted into the outward open recess of the base 20. The centering pieces 12.5 slide along the stops 36, 46. The butt surface 12.8 of the front of the frame leg 10 contacts the webs 32, 42 of the base 20. In this position, the vertical frame leg 10 is aligned to its centering pieces 12.5. Thus the securing section 12.6 is positioned toward the inner space of the rack.

A precise vertical alignment of the frame leg 10 to the recess 35, 45 is possible. Since it is adapted to the outer geometry of the vertical frame leg 10, it can be set down flush.

Figure 2:
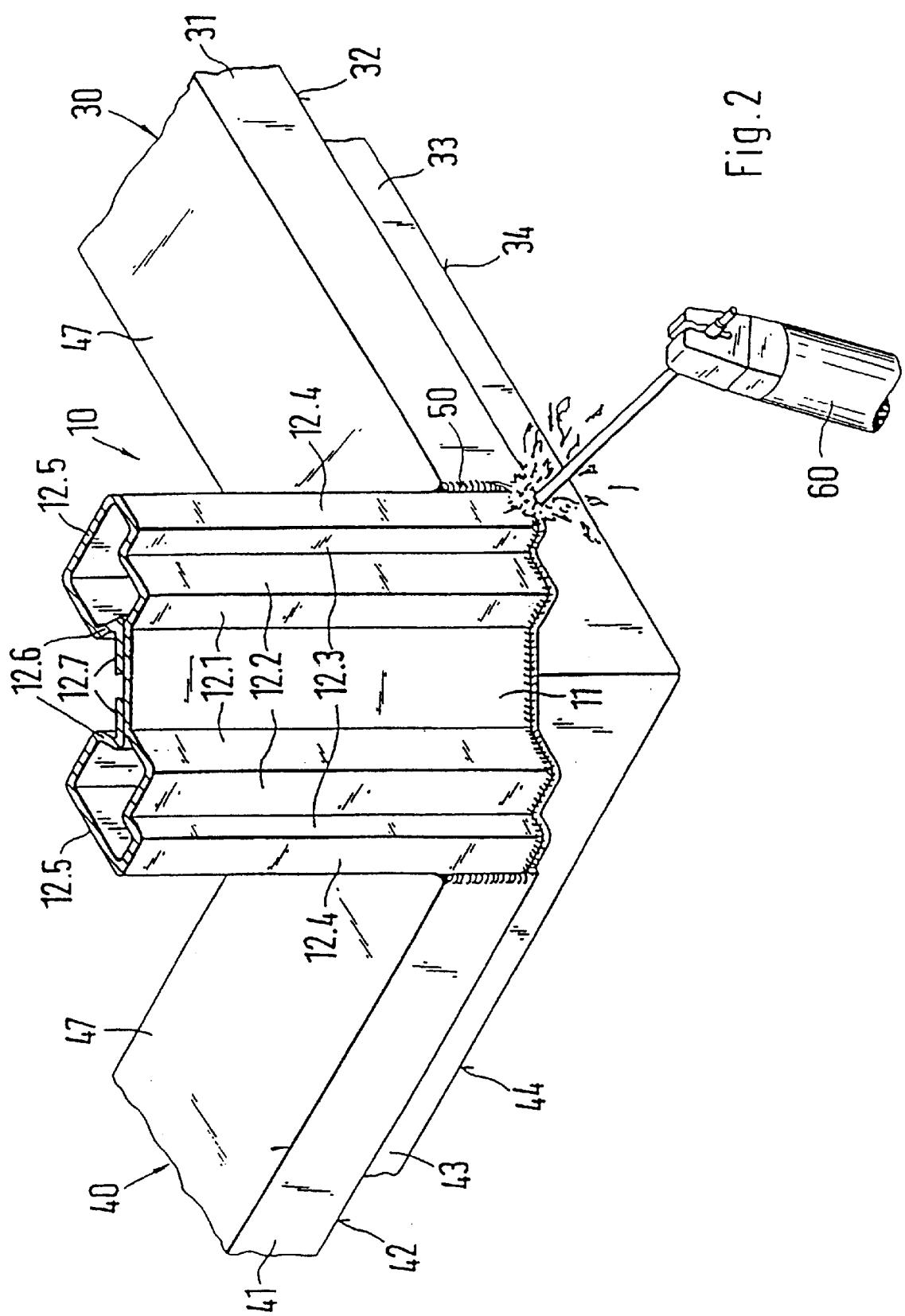
FIG. 2 is a partial perspective view of the part according to FIG. 1, shown as an assembled unit.

This installed position is shown in detail in FIG. 2. For final mounting, the vertical frame leg 10 is welded to the base 20. The formed weld seam 50 runs along the stops 36, 46 along the contact web 31, 41 to the recesses 35, 45.

As is visible in FIG. 2, a perimeter sealing and/or contact frame forms with the side pieces 12.4 and the contact webs 31, 41.

What is claimed is:

1. In a switching cabinet having a rack, with a base (20) formed of length and depth struts (30, 40) with connected vertical frame pieces (10), where the vertical frame pieces (10) are inserted into a cavity formed by ends of the length and depth struts (30, 40) and are welded with the base (20) to form a corner connector, the improvement comprising:

the vertical frame pieces (10) having a plurality of centering pieces (12.5) aligned with stops (36, 46) of the length and depth struts (30, 40), in a vertical direction at a distance from the stops (36, 46) a plurality of webs (32, 42) positioned at the length and depth struts (30, 40), to which one of the vertical frame pieces (10) is welded at an abutting end (12.8) of the one vertical frame piece (10) and the vertical frame piece (10) is welded to the length and depth struts (30, 40) at the abutting end (12.8) and at the centering pieces (12.5).

2. In the switching cabinet according to claim 1, wherein the centering pieces (12.5) of the vertical frame pieces (10) are aligned perpendicular to the allocated side surfaces of the rack, and the stops (36, 46) are arranged in a web-like manner to each other at an angle of 90° and form an open cavity.

3. In the switching cabinet according to claim 1, wherein the one vertical frame piece (10) is profiled at a side pointing outward in a corner region, and the webs (32, 42) have a release surface adapted to the profiled side.

4. In the switching cabinet according to claim 3, wherein the stops (36, 46) of the length and depth struts (30, 40) are formed at the front sides of a cover piece (37, 47) and the web (32, 42) is connected by a vertical contact web (31, 41).

5. In a switching cabinet according to claim 4, wherein a plurality of side parts (12.4) of the vertical frame piece (10) are connected to the centering pieces (12.5) and the side parts (12.4) each extend to the contact web (31, 41) to form at least one of a sealed frame and a contact frame for one of a side wall and a switching cabinet door.

6. In a switching cabinet according to claim 5, wherein at a plurality of ends of the one vertical frame piece (10) turned away from the base (20) a cover frame has a configuration that corresponds to the base (20).

7. In the switching cabinet according to claim 1, wherein the stops (36, 46) of the length and depth struts (30, 40) are formed at the front sides of a cover piece (37, 47) and the web (32, 42) is connected by a vertical contact web (31, 41).

8. In a switching cabinet according to claim 1, wherein a plurality of side parts (12.4) of the vertical frame piece (10) are connected to the centering pieces (12.5) and the side parts (12.4) each extend to a contact web (31, 41) to form at least one of a sealed frame and a contact frame for one of a side wall and a switching cabinet door.

9. In a switching cabinet according to claim 1, wherein at a plurality of ends of the one vertical frame piece (10) turned away from the base (20) a cover frame has a configuration that corresponds to the base (20).

* * * * *